(12) United States Patent
Blankenship et al.

(10) Patent No.: US 9,094,050 B2
(45) Date of Patent: Jul. 28, 2015

(54) METHODS AND APPARATUS TO FACILITATE DEVICE-TO-DEVICE COMMUNICATION

(71) Applicant: Research In Motion Limited, Waterloo (CA)

(72) Inventors: Yufei Wu Blankenship, Kildeer, IL (US); David Stuart Furbeck, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 140 days.

(21) Appl. No.: 13/750,777

(22) Filed: Jan. 25, 2013

(65) Prior Publication Data

US 2014/0213306 A1 Jul. 31, 2014

(51) Int. Cl.
H04W 4/00 (2009.01)
H04W 24/00 (2009.01)
H04B 5/00 (2006.01)
H04W 4/02 (2009.01)
H04W 4/20 (2009.01)
H04L 29/06 (2006.01)
H04L 29/08 (2006.01)

(52) U.S. Cl.
CPC ............. *H04B 5/0031* (2013.01); *H04L 69/24* (2013.01); *H04W 4/023* (2013.01); *H04W 4/206* (2013.01); *H04L 67/24* (2013.01)

(58) Field of Classification Search
CPC ... H04B 5/0031; H04W 76/023; H04W 8/005
USPC ................. 455/457, 41.1, 456.1, 41.2, 456.3; 370/329
See application file for complete search history.

(56) References Cited

U.S. PATENT DOCUMENTS

| 2010/0280904 | A1 | 11/2010 | Ahuja | |
|---|---|---|---|---|
| 2014/0004796 | A1* | 1/2014 | Cakulev et al. | 455/41.2 |
| 2014/0094119 | A1* | 4/2014 | Stojanovski et al. | 455/41.1 |
| 2014/0192737 | A1* | 7/2014 | Belghoul et al. | 370/329 |

FOREIGN PATENT DOCUMENTS

| GB | 2488120 | 8/2012 |
|---|---|---|
| WO | 2011020180 | 2/2011 |

OTHER PUBLICATIONS

European Patent Office, Partial European Search Report issued in connection with European Application No. 13160237.7, dated Apr. 22, 2014, 5 pages.

European Patent Office, Extended European Search Report issued in connection with European Application No. 13160237.7, dated Jul. 23, 2014, 12 pages.

(Continued)

*Primary Examiner* — Barry Taylor
(74) *Attorney, Agent, or Firm* — Fish & Richardson P.C.

(57) ABSTRACT

Methods and apparatus to facilitate device-to-device communication with a remote device registered with a communication network are described. One example method may include obtaining an identity information of the second device from an address book, submitting the identity information of the second device to a communication network, estimating device-to-device (D2D) proximity of the second device, generating an indication of the proximity of the second device relative to the first device, and initiating a device-to-device communication session with the second device when the indication is that the second device is proximate.

26 Claims, 8 Drawing Sheets

(56) References Cited

OTHER PUBLICATIONS

European Patent Office, Communication pursuant to Rules 70(2) and 70a(2) EPC and reference to Rule 39(1) EPC issued in connection with European Application No. 13160237.7, dated Aug. 25, 2014, 2 pages.

3GPP, New Study on LTE Direct Communication, RP-120698, http://www.3gpp.org/ftp/tsg_ran/TSG_RAN/TSGR_56/Docs/RP-120698.zip, Jun. 13-15, 2012, 5 pages.

3GPP, New Study on LTE Device to Device Proximity Discovery, Qualcomm Inc., RP-120872, http://www.3gpp.org/ftp/tsg_ran/TSG_RAN/TSGR_56/Docs/RP-120872.zip, Jun. 13-15, 2012, 6 pages.

Open Mobile Alliance, UserPlane for Location, V2.0.1, http://www.openmobilealliance.org/technical/release_program/supl_v2_0.aspx, dated Dec. 5, 2012, 396 pages.

GSMA, Rich Communication Suite 5.0 Advanced Communications Services and Client Specification Version 1.0, http://www.gsma.com/rcs/wp-content/uploads/2012/04/rcs5_0_advanced_communications_specification_version10.pdf, dated Apr. 19, 2012, 336 pages.

Rosenberg et al., SIP: Session Initiation Protocol, IETF RFC 3261, http://tools.ietf.org/html/rfc3261, dated Jun. 2002, 270 pages.

Andreasen, Session Description Protocol (SDP) Capability Negotiation, IETF RFC 5939, http://tools.ietf.org/html/rfc5939, dated Sep. 2010, 78 pages.

Camarillo et al., Integration of Resource Management and Session Initiation Protocol (SIP), IETF RFC 3312, http://tools.ietf.org/html/rfc3312, dated Oct. 2002, 31 pages.

3GPP, TS 23.401 V11.4.0, General Packet Radio Service (GPRS) enhancements for Evolved Universal Terrestrial Radio Access Network (E-UTRAN) access, http://www.3gpp.org/ftp/Specs/html-info/23401.htm, Dec. 2012, 284 pages.

\* cited by examiner

```
        SDP Offer1                              SDP Answer1
302 ↘   ---------------              304 ↘     ---------------
      ⎧ m=audio 4444 RTP/AVP 0 96 97 98       ⎧ m=audio 4888 RTP/AVP 0 97 98
      ⎪ a=rtpmap:0 PCMU                       ⎪ a=rtpmap:0 PCMU
502  ⎨  a=rtpmap:96 G726-32/8000         602 ⎨  a=rtpmap:97 AMR-WB
      ⎪ a=rtpmap:97 AMR-WB                    ⎩ a=rtpmap:98 telephone-event
      ⎩ a=rtpmap:98 telephone-event      604 ── a=curr:d2d none
504 ── a=curr:d2d  none                  606 ── a=des:d2d mandatory sendrecv
506 ── a=des:d2d mandatory sendrecv
              FIG. 5                                  FIG. 6
```

```
        SDP Offer2                              SDP Answer2
306 ↘   ---------------              308 ↘     ---------------
      ⎧ m=audio 4444 RTP/AVP 97 98           ⎧ m=audio 4888 RTP/AVP 97 98
702  ⎨  a=rtpmap:97 AMR-WB             802  ⎨  a=rtpmap:97 AMR-WB
      ⎩ a=rtpmap:98 telephone-event          ⎩ a=rtpmap:98 telephone-event
704 ── a=curr:d2d none                   804 ── a=curr:d2d none
706 ── a=des:d2d mandatory sendrecv      806 ── a=des:d2d mandatory sendrecv
              FIG. 7                                  FIG. 8
```

```
        SDP Offer3                              SDP Answer3
310 ↘   ---------------              312 ↘     ---------------
        m=audio 4444 RTP/AVP 97 98              m=audio 4888 RTP/AVP 97 98
        a=rtpmap:97 AMR-WB                      a=rtpmap:97 AMR-WB
        a=rtpmap:98 telephone-event             a=rtpmap:98 telephone-event
902 ── a=curr:d2d sendrecv                      a=curr:d2d sendrecv
        a=des:d2d sendrecv                      a=des:d2d sendrecv
              FIG. 9                                  FIG. 10
```

METHODS AND APPARATUS TO FACILITATE DEVICE-TO-DEVICE COMMUNICATION

FIELD OF THE DISCLOSURE

This disclosure relates generally to mobile communications and, more particularly, to methods and apparatus to facilitate device-to-device communication.

BACKGROUND

Device-to-device (D2D) communication enables two mobile communication devices to directly connect with one another. The facilitation of device discovery and link establishment in D2D communication systems is important to a functional D2D communication system.

BRIEF DESCRIPTION OF THE DRAWINGS

FIG. 5 is an example first offer message that may be sent from a first device to a second device to facilitate D2D communication.

FIG. 6 is an example first answer message that may be sent from the second device to the first device to facilitate D2D communication.

FIG. 7 is an example second offer message that may be sent from the first device to the second device to facilitate D2D communication.

FIG. 8 is an example second answer message that may be sent from the second device to the first device to facilitate D2D communication.

FIG. 9 is an example third offer message that may be sent from the first device to the second device to facilitate D2D communication.

FIG. 10 is an example third answer message that may be sent from the second device to the first device to facilitate D2D communication.

DETAILED DESCRIPTION

Figure 1:
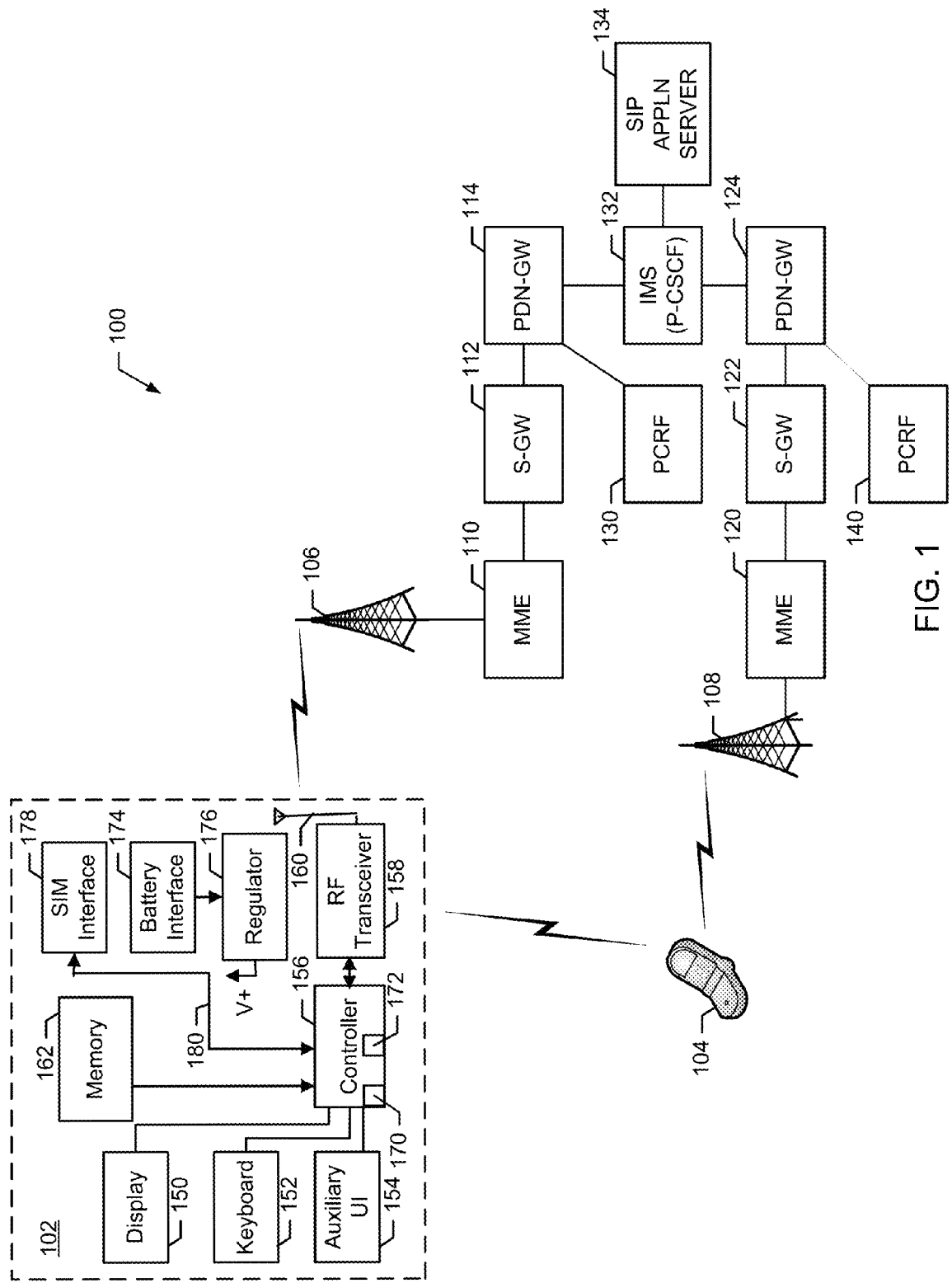
FIG. 1 is a block diagram of an example communication system to facilitate device-to-device (D2D) communication.

Described herein are example methods, apparatus, and articles of manufacture to facilitate device-to-device communication between a first device and a second device. In order for it to be possible to communicate directly, two devices must be within a certain distance of each other, the distance depending on factors including transmission power, antenna gains, and carrier frequency. When two devices are able to establish a direct link, they will be referred to herein as device-to-device proximate (D2D proximate) or in or within "D2D proximity" of each other. An estimate of the geographic proximity (distance between the two devices) can be used, for example, to estimate whether the devices are D2D proximate prior to testing or confirming whether they actually are D2D proximate. Two devices that are either estimated to be D2D proximate or confirmed to be D2D proximate will simply be referred to as proximate herein.

One example method to facilitate device-to-device communication between a first device and a second device includes obtaining an identity information of the second device from an address book, submitting the identity information of the second device to a communication network, estimating D2D proximity of the second device, generating an indication of the proximity of the second device relative to the first device and initiating a device-to-device communication session with the second device when the indication is that the second device is proximate.

In one example, estimating D2D proximity of the second device is based on received location information of the second device. The location information of the second device may be received from the second device in response to a Geolocation Pull request or received in a Geolocation Push message. The location information of the second device may also be received from a presence server.

Estimating D2D proximity of the second device may include determining a tracking area of the second device or determining a registration status of the second device. The indication of the proximity may be displayed using, for example, an indication in an address book. The proximity of the second device may be included in presence information of the first device and sent to a presence server.

The method may also include testing a device-to-device connection prior to initiating the device-to-device communication session. The method may also include generating a D2D proximity information element based on testing the device-to-device connection, and including the D2D proximity information element in a presence information element of the first device.

The method may also include utilizing an alternate communication technology to communicate with the second device when the second device is not proximate. Additionally, the method may include evaluating a link quality of the device-to-device communication session and modifying the device-to-device communication session based on the link quality.

In one example described herein, a mobile device may be configured to facilitate device-to-device communication between a first device and a second device. The mobile device may include a processor configured to obtain an identity information of the second device from an address book, submit the identity information of the second device to a communication network, estimate D2D proximity of the second device, generate an indication of the proximity of the second device relative to the first device, and initiate a device-to-device communication session with the second device when the indication is that the second device is proximate.

In one example, the processor may be configured to send a Session Initiation (SIP) INVITE message to the second device. The processor may also be configured to send Session Description Protocol (SDP) information to the second device containing SDP extensions for a SIP preconditions framework. In one example, the SDP extensions include a precondition that a direct link is confirmed.

Also described herein is a tangible computer readable storage medium including instructions that, when executed, cause a machine to, for example, obtain an identity information of the second device from an address book, submit the identity information of the second device to a communication network, estimate D2D proximity of the second device, generate an indication of the proximity of the second device relative to the first device, and initiate a device-to-device communication session with the second device when the indication is that the second device is proximate.

The tangible computer readable storage medium may also include instructions that, when executed, cause a machine to send a Session Initiation (SIP) INVITE message to the second device and to send Session Description Protocol (SDP) information to the second device containing SDP extensions for a SIP preconditions framework. In one example, the SDP extensions include a precondition that a direct link is confirmed.

Shown in FIG. 1 is a block diagram of an example communication system 100 implemented as described herein to facilitate device-to-device (D2D) communication. D2D is a direct connection between two mobile devices. According to an illustrated example, first and second user equipment (UE) 102, 104 may communicate with one or more wireless communication networks in addition to the wireless link between the devices. For example, the UE 102 may communicate with a first evolved node B (eNB) 106 and the UE 104 may communication with a second eNB 108. These connections may be made through a long term evolution (LTE) network, one example of which is shown as Evolved Universal Terrestrial Radio Access Network (E-UTRAN). Alternatively, other access networks may be used such as networks that are not third generation partnership project (non-3GPP access networks), GSM/EDGE Radio Access Networks, UTRAN, WiFi, etc.

As shown in FIG. 1, the first eNB 106 is coupled to a first mobility management entity (MME) 110, which is further coupled to a first serving gateway (S-GW) 112. The first S-GW 112 is coupled to a first packet data network gateway (PDN-GW) 114. Similarly, the second eNB 108 is coupled to a second mobility management entity (MME) 120, which is further coupled to a second serving gateway (S-GW) 122. The second S-GW 122 is coupled to a second packet data network gateway (PDN-GW) 124. The first PDN-GW 114 is coupled to a policy and charging rules function (PCRF) 130. The first and second PDN-GWs 114, 124 are coupled to an Internet protocol multimedia subsystem (IMS) 132, which includes a proxy-call state control function (P-CSCF). The IMS 132 is also coupled to a session initiation protocol (SIP) application server 134. The second PDN-GW 124 is also coupled to a PCRF 140.

As shown in one example in FIG. 1, the UE 102 includes a visual display 150, a keyboard 152, and perhaps one or more auxiliary user interfaces (UI) 154, each of which is coupled to a controller 156. The controller 156 is also coupled to a radio frequency (RF) transceiver circuitry 158, which is further coupled to an antenna 160. In one example, the controller 156 is implemented using a central processing unit (CPU) that runs operating system software and other software stored in a memory 162. The controller 156 will normally control overall operation of UE 102, whereas signal processing operations associated with communication functions are typically performed by the RF transceiver circuitry 158. The controller 156 interfaces with the display 150 to present received information, stored information, user inputs, and the like.

The example controller 156 includes a D2D facilitator 170 that facilitates device-to-device communication, as described below. For example, in addition to other functionality, the D2D facilitator 170 may determine proximity of another UE, such as the UE 104, and facilitate establishment of a device-to-device link between the UE 102 and the UE 104. Example methods and apparatus to implement the D2D facilitator 170 are described below in conjunction with the figures. Additionally, the example controller 156 may include enhanced address book (EAB) functionality 172 in which contact data is enhanced with presence and service capabilities information associated with other devices (e.g., the UE 104). The concept of the EAB is part of the rich communication suite (RCS), which is a GSM association (GSMA) effort focused on exploiting a richer set of communication services (in addition to voice) that can harness the benefits of IMS. These services include Instant Messaging, Video and Image Share, Video Calling, etc. The user interface entry point for these services in the UE 102, 104 is the EAB. Coded instructions to implement the D2D facilitator 170 and the EAB 172 may be stored in the memory 162. As described herein, D2D capabilities are included into the EAB of RCS, so that devices can launch D2D Communications from the EAB. Location information can also be enhanced or supplemented with location information from D2D.

The keyboard 152, which may be a telephone type keypad or full alphanumeric keyboard, is normally provided for entering data for storage in the UE 102, information for transmission to the network. Such data may include a telephone number to place a telephone call, commands to be executed on the UE 102, and possibly other or different user inputs.

The UE 102 sends communication signals to, and receives communication signals from the eNB 106 over a wireless link via the antenna 160. The RF transceiver circuitry 158 performs, for example, modulation/demodulation, encoding/decoding, and encryption/decryption. The RF transceiver circuitry 158 is adapted to particular wireless network or networks in which UE 102 may operate.

The UE 102 further includes a battery interface 174 to receive one or more rechargeable batteries (not shown) that provide power to electrical circuitry in UE 102. The battery interface 174 provides for a mechanical and electrical connection for the battery. The battery interface 174 is coupled to a regulator 176 that regulates power V+ to the device. When the UE 102 is operational, an RF transmitter of the RF transceiver circuitry 158 is typically keyed or turned on only when it is sending information to the network, and is otherwise turned off to conserve resources. Similarly, an RF receiver of the RF transceiver circuitry 158 is typically periodically turned off to conserve power until it is needed to receive signals or information (if at all) during designated time periods.

The UE 102 operates using a Subscriber Identity Module (SIM) (not shown) that is connected to or inserted in the UE 102 at a SIM interface 178. Without the SIM, the UE 102 may be referred to as mobile equipment (ME). The SIM is one type of a removable memory module or smart card used to identify an end user of UE 102 (or subscriber) and to personalize the device, among other things. Without the SIM, the example UE 102 is not fully operational for communication. By inserting the SIM into the UE 102, an end user can have access to any and all of his/her subscribed services.

The SIM generally includes a processor and memory for storing information. Because the SIM is coupled to the SIM interface 178, it is coupled to the controller 156 through communication lines 180. To identify the subscriber, the SIM contains some user parameters such as an International Mobile Subscriber Identity (IMSI). An advantage of using the SIM is that end users are not necessarily bound by any single physical mobile station because the SIM may be used in any number of different mobile stations. The SIM may store additional user information for the UE 102 as well, including datebook (or calendar) information, recent call information, and network connection information, or EAB information.

The UE 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem such as a laptop, notebook, or tablet. Alternatively, the DE 102 may be a multiple-module unit comprising a plurality of separate components, including but in no way limited to a computer or other device connected to a wireless modem. In particular, for example, in the mobile station block diagram of FIG. 1, the RF transceiver circuitry 158 and antenna 160 may be implemented as a radio modem unit that may be inserted into a port on a laptop computer. In this case, the laptop computer would include the display 150, keyboard 152, one or more auxiliary UIs 154, and the controller 156 may be the computer's CPU. A computer or other equipment not normally capable of wireless communication may be adapted to connect to and effectively assume control of the RF transceiver circuitry 158 and the antenna 160 of a single-unit device such as one of those described above.

The eNB 106 is hardware and software that directly communicates with the UE 102 via a wireless link. In one example, the eNB 106 includes functionality to facilitate message exchange with the UE 102, but the eNB 106 is controlled by other elements in the communication network.

The S-GW 112 communicates with the eNB 106 to route data packets between the network and the eNB 106. For example, the S-GW manages downlink paths and paging and may also store the context (e.g., bearer service parameters, network internal routing information, etc.) of the UE 102.

The PDN-GW 114 provides connectivity from the UE to the IMS 132 or any other external packet data networks. The PDN-GW 114 functions as the point of exit and entry of traffic for the UE 102.

The PCRF 130 is a node in an evolved packet core (EPC) that receives session description protocol (SDP) information from the IMS 132 and applies policy to allocated bearers. Bearers may be dedicated or default bearers.

The IMS 132 is an architectural framework for delivering Internet protocol (IP) multimedia services, which may include the P-CSCF. The IMS 132 offers Internet services using cellular technologies. The IMS framework enables QoS (Quality of Service), charging, and the integration of different services to the UEs 102, 104. The P-CSCF is a session initiation protocol (SIP) proxy that is the entry point to the core network for all SIP signaling from the UEs 102, 104 in the IMS 132. SIP is a signaling protocol used to setup IP communication sessions such as video or voice calls.

The SIP application server 134 may include any number of different SIP applications that may be used to perform different functions. In one example, the SIP application server may receive SIP messages and obtain SDP information from the SIP messages. The SDP information may then be passed to other components in the network.

In the following examples, the processes represented by each communication flow or flowchart may be implemented by one or more programs comprising machine readable instructions for execution by: (a) a processor, such as the microprocessor 1412 shown in the example computer system 1400 discussed below in connection with FIG. 14, (b) a controller, such as the controller 156 of FIG. 1, and/or (c) any other suitable device. The one or more programs may be embodied in software stored on a tangible medium such as, for example, a flash memory, a CD-ROM, a floppy disk, a hard drive, a DVD, or a memory associated with the processor 1412, but the entire program or programs and/or portions thereof could alternatively be executed by a device other than the microprocessor 1412 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually.

Further, although the example processes are described with reference to flowcharts, many other techniques for implementing the example methods and apparatus described herein may alternatively be used. For example, the UE 102 and UE 104 may communicate with a same eNB. For example, with reference to the flowcharts, the order of execution of the blocks may be changed, and/or some of the blocks described may be changed, eliminated, combined, and/or subdivided into multiple blocks. Any of the described blocks may be implemented as part of an existing system. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Figure 2:
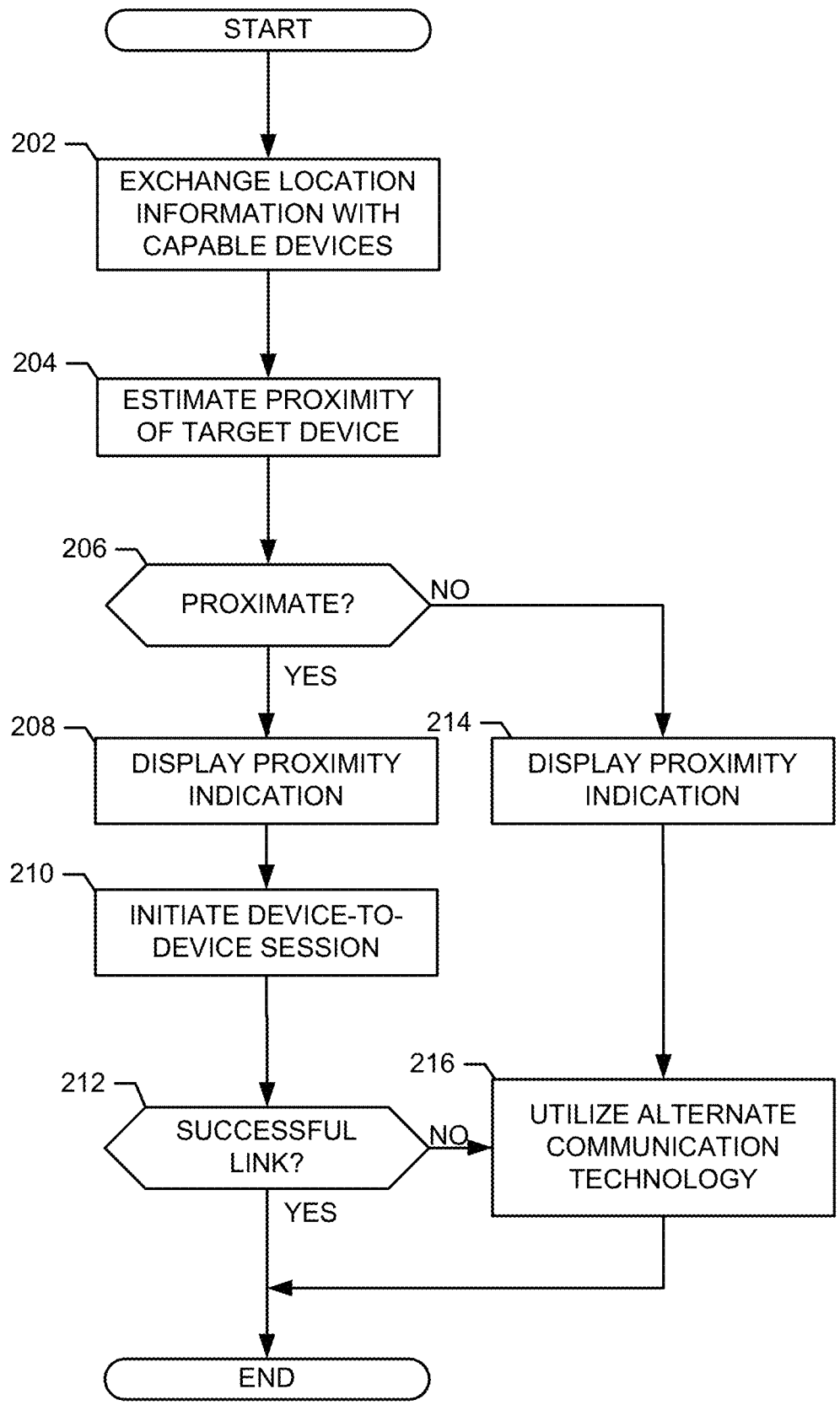
FIG. 2 is a sequence diagram of example messaging that may take place in a communication system to facilitate D2D communication.

FIG. 2 shows an example process that may be carried out by a UE (e.g. the UE 102 and/or the UE 104 of FIG. 1) to facilitate D2D communication. In one example, the process of FIG. 2 may be initiated by a user of the UE 102 selecting of a UE (e.g., the UE 104) as a target device with which the user would like to communicate. In other examples, the process of FIG. 2 may operate as a background task on the UE 102. As described below, location information is exchanged between contacts stored in Enhanced Address Books (EABs) of the UEs 102, 104, either through Social Presence Information (SPI) or geolocation PUSH or PULL. It is assumed that the contacts have given permission for such an exchange. The location information gives an estimate of D2D proximity between the DE 102 and the UE 104, as well as other UEs between which information is exchanged. If the estimated distance between devices is below a certain threshold distance (possibly based on one or more factors such as signal strength, noise, interference, etc.) then the devices may attempt (or the RCS client might attempt automatically) to initiate a session using D2D or to test a D2D link and confirm D2D proximity. Alternatively, a user may attempt to establish a D2D connection, perhaps based on an indication in the EAB that another device or user is within the threshold distance. The foregoing takes place before the D2D link is tested and the devices are confirmed to be in D2D proximity. A first device could issue a SIP Invite indicating a desire for D2D communication either in a SIP header or in the SDP that is included in the SIP message. The network might monitor the SIP communication and the included SDP and then decide whether or not to direct the devices to test a D2D link to determine whether they are in D2D proximity. It is also possible that the D2D link is tested prior to session initiation and the estimation that another device is in D2D proximity could be generated as a proximity information element and displayed in the EAB by, for example, displaying a marker based on testing the device-to-device connection. In this case the devices may attempt (or the RCS client might attempt automatically) to initiate a session based on confirmed D2D proximity. Alternatively, the user may attempt to establish a D2D connection, based on the confirmed D2D proximity displayed in the EAB.

As shown in FIG. 2, the UE 102 exchanges location information with capable devices (block 202). The location information may be global navigation satellite system (GNSS) information, such as global positioning system (GPS) information. In some examples, location information may be determined using the secure user plane location (SUPL) protocol developed by the Open Mobile Alliance (OMA). The UE 102 may use SUPL to send assistance and positioning data over traffic channels using a secure IP connection between the UE 102, which is acting as a SUPL enabled terminal (SET), and a SUPL Location Platform (SLP) on the network side. In one example, SUPL 2.0 supports the trigger of location measurement by the network or the SET based on user location. When a user enters or leaves a target geographic area or a particular network area (location area or cell for example) a position event can be triggered.

In Rich Communication Suite (RCS) 5.0, SUPL supports the transfer of geolocation information either as part of Social Presence Information (SPI) or Geolocation PUSH and Geolocation PULL. Social Presence Information is information that users share with contacts, such as status/availability, geolocation, service capabilities, etc. Geolocation PUSH and PULL can be supported without a Presence Server. Using Geolocation PUSH, a user could push their current location or a meeting place, etc. Using Geolocation PUSH, the RCS client sends a Session Initiation Protocol (SIP) INVITE that contains Session Description Protocol (SDP) parameters indicating an offer to have a Message Session Relay Protocol (MSRP) session. In RCS, MSRP is used for file transfer (as well as instant messaging and image share) and the purpose of the SIP session in this case is to transfer a file that includes the user location to the other party. Geolocation PULL uses OneAPI, which is a set of application programming interfaces supported by the GSM Association. Geolocation PULL relies on SMS.

After location information is exchanged (block 202), the UE 102 estimates D2D proximity of a target device (e.g., the UE 104) (block 204) and determines if the UE 104 is proximate to the UE 102 (block 206). The identity information of the target device may be obtained from an address book stored in and maintained by the UE 102. Proximity may be estimated using a number of different techniques. Geographical proximity (physical distance between two devices) and D2D proximity are highly correlated, which allows the radio-based D2D proximity indication to give users a fairly reliable indication if a contact is physically close to the user. However, geographical proximity and D2D proximity are different in that the D2D proximity is an indicator of radio signal detection capability, which is affected by the transmitter configuration, the receiver configuration, and the radio channel between the transmitter and receiver.

When two devices are geographically far apart, e.g., two different cities, then they are not in D2D proximity. When two devices are geographically close, two devices may or may not be in D2D proximity. For example, if two users are in two adjacent rooms separated by a thick wall, their devices may not be able to detect each other's signal due to the high attenuation of the signal by the wall. For example, let the UE 102 be the discovering device (i.e., trying to detect the signal of UE 104), and UE 104 be the discoverable device (i.e., transmitting radio signals to allow others to detect it). An example process to determine D2D proximity $P_{D2D}$ with geographical distance d as input can be summarized as follows:

If $d > D_0$, $P_{D2D}$ = "not in D2D proximity"

If $d \leq D_0$, $P_{D2D}$ = "not in D2D proximity" if UE 102 is not able to detect a radio signal (or possibly a particular sequence of symbols) from UE 104;

$P_{D2D}$ = "in D2D proximity", if UE 102 is able to detect a radio signal (or possibly a particular sequence of symbols) from UE 104.

Here $D_0$ is the maximum distance where radio-based D2D proximity detection is possible. $D_0$ may vary as a function of factors such as carrier frequency of the radio signal, the type of environment the devices are in, etc. In one example, $D_0$ can be estimated using the minimum signal power level detectable by the UE 102, the maximum transmission power of UE 104 and the assumption of free space propagation. The geolocation information available in the RCS architecture makes it easier to enable D2D service by providing an estimate of d.

The UE 102 may indicate, through a user interface, information based on location as to whether or not it is likely to be in D2D proximity with another device or an estimate of D2D proximity. For example, the estimate might simply be a flag with value of 1 if the estimate is that the devices are in D2D proximity and 0 otherwise. The information can be an estimate prior to testing a D2D link. This estimated D2D proximity may be shown in the EAB and shared as part of presence information. If D2D proximity is subsequently confirmed, then this confirmed D2D proximity might be shown in the EAB. The confirmed D2D proximity might also be included in presence information. For example, the UE 102 can use the free space propagation model to choose the value of $D_0$. In this case the received power level at distance d is:

$$P_r(d) = \frac{P_t G_t G_r \lambda^2}{(4\pi)^2 d^2}$$

Where $P_r$ is the received power, $P_t$ is the transmitted power, $G_t$ is the transmitter antenna gain, $G_r$ is the receiver antenna gain, $\lambda$ is the wavelength in meters. Assuming the transmitting device has the same $P_{t,max}$, $G_t$, and $G_r$ as the receiving device, utilizing the minimum received power level the device requires, the maximum distance within which a receiving device can detect a peer device's signal is estimated as follows.

$$d_{max} = \frac{\lambda}{4\pi} \sqrt{\frac{P_{t,max} G_t G_r}{P_{r,min}}}$$

This calculated $d_{max}$ value can be used as $D_0$ in the above process of determining D2D proximity $P_{D2D}$. If the geolocation information indicates that the distance between UE 102 and UE 104 is greater than $d_{max}$, then UE 102 might not attempt any D2D discovery or D2D communication or it may otherwise indicate to the user that the UE 102 and the UE 104 are not within D2D proximity.

While the free space propagation model is simple, the $d_{max}$ estimation can be much greater than the realistic maximum distance because the free space model does not account for the myriad degradations from which the realistic channel suffers. Thus, the $d_{max}$ estimation can be improved by using more sophisticated models to provide $D_0$. For example, path loss exponents of the specific propagation environment the device is in can be used instead of the path loss exponent (=2) of the free space model. For instance, if the device is obstructed by a building, a path loss exponent of between 4 and 6 might be used, resulting in a smaller $D_0$ value.

While the current RCS specification provides geolocation information in two-dimensional (x, y) coordinates, this information may not be sufficient for D2D proximity estimation purposes since the D2D link is likely to have limited range. For example, if the UE 102 is located at the first floor of a building and the UE 104 is at the 10th floor of the same building, their (x, y) coordinates may show that they are close to each other on a flat 2-D map, but their difference in altitude prevents them from establishing any D2D link. In the future, the RCS specification may need to define 3-D geolocation information (x, y, z). Such 3-D geolocation information can be used by the devices to more accurately estimate the distance for the possibility of D2D communication. The description herein makes reference to two dimensional coordinates (x, y), however it is to be understood that this may be expanded to include 3-D geolocation information (x, y, z).

The UE 104 can compare the coordinates of UE 102 with its own coordinates. The comparison gives a distance estimate of UE 102 and UE 104. The UE 104 can then compare the distance estimate with the D2D link range of UE 104, and generate a likelihood indicator if UE 102 and UE 104 are sufficiently close to establish D2D link. The D2D link range may be different depending on which type of D2D service is being considered, for example D2D discovery service is likely to have longer range compared to D2D communication services.

If the UE 102 determines that the UE 104 is proximate (block 206), the UE 102 generates and displays a proximity indication (block 208). The UE 102 may provide the proximity indication via a user interface, such as, for example, an indication in the EAB, or in any other suitable manner. The indication in the EAB may be based, for example, on a calculated estimate compared to a threshold, as described above. The proximity information may also be included in presence information and exchanged with a presence server.

The UE 102 then initiates a D2D session with the UE 104 (block 210) and determines if the D2D link between the UE 102 and the UE 104 was successful (block 212). Further details regarding the initiation of the D2D session are provided below. If the link was successful, the UE 102 and the UE 104 continue with a D2D session.

If the UE 102 determines that the UE 104 is not proximate (block 206), the UE 102 generates the corresponding proximity information element and displays the proximity indication (block 214) in, for example, the EAB. Alternatively, the UE may not display a proximity indication for an unsuccessful D2D session, and only successful D2D sessions lead to a proximity indication display. Additionally, an alternate communication technology may be used to communicate between the DE 102 and the UE 104 (block 216). For example, an alternate communication technology such as cellular technology may be used to facilitate a connection between the UE 102 and the UE 104, rather than a direct link between UE 102 and UE 104.

Figure 3:
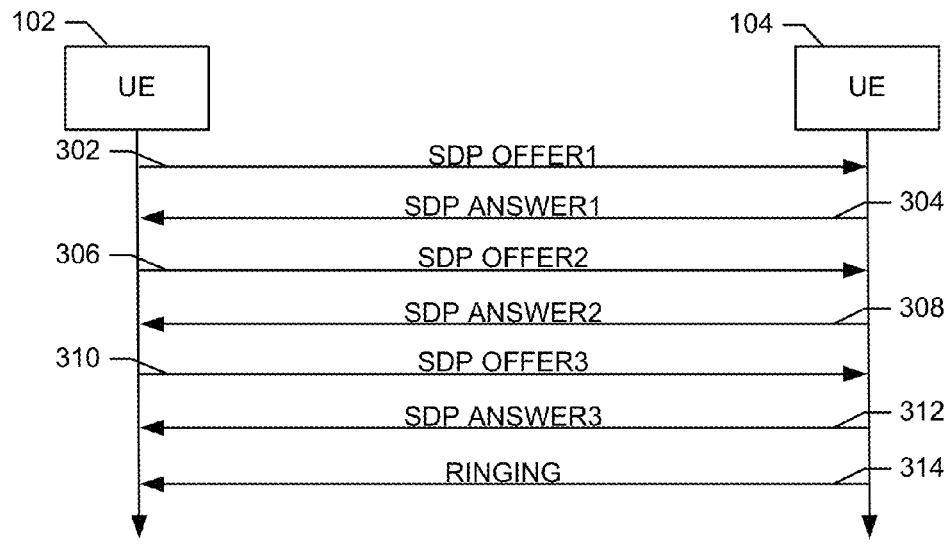
FIG. 3 is a sequence diagram of a process that may be implemented using machine readable instructions to facilitate D2D communication.

FIG. 3 shows further detail of the UE 102 interoperating with the UE 104 to initiate a D2D session. Once the UE 102 has determined that the UE 104 is proximate (as described above and as indicated in the EAB) and the device capabilities of the UE 104 are such that the DE 104 is capable and available for D2D communication, the UE 102 sends a SIP INVITE to the UE 104 to indicate the desire to use D2D communication, which is indicated either by information in a SIP header or via SDP information carried within the SIP INVITE. In case a D2D link cannot be established, SDP Capability Negotiation might be used where the preferred potential configuration is to use D2D, yet the default configuration is to use a non-D2D ordinary means of communication.

As explained below, the PCRF 130 monitors the SDP and allocates the appropriate network resources. After resources are allocated the UE 102 and the UE 104 can test a D2D link In one example, the DE 102 may transmit a beacon or signature signal that UE 104 can detect. Information about this beacon or signature signal can be included in a new SIP header, an existing SIP header with a new parameter, the SDP included in the SIP invite, or provided by the eNB(s) at the radio access level.

Resource reservation with D2D may involve the network assigning the physical channel for the UEs to communicate. In the case of LTE, it would involve the eNB 108, 110 assigning the resources, which might include one or more physical channels or dedicated radio bearers and it may also involve the UEs testing the link to see if communication is successful.

Figure 4:
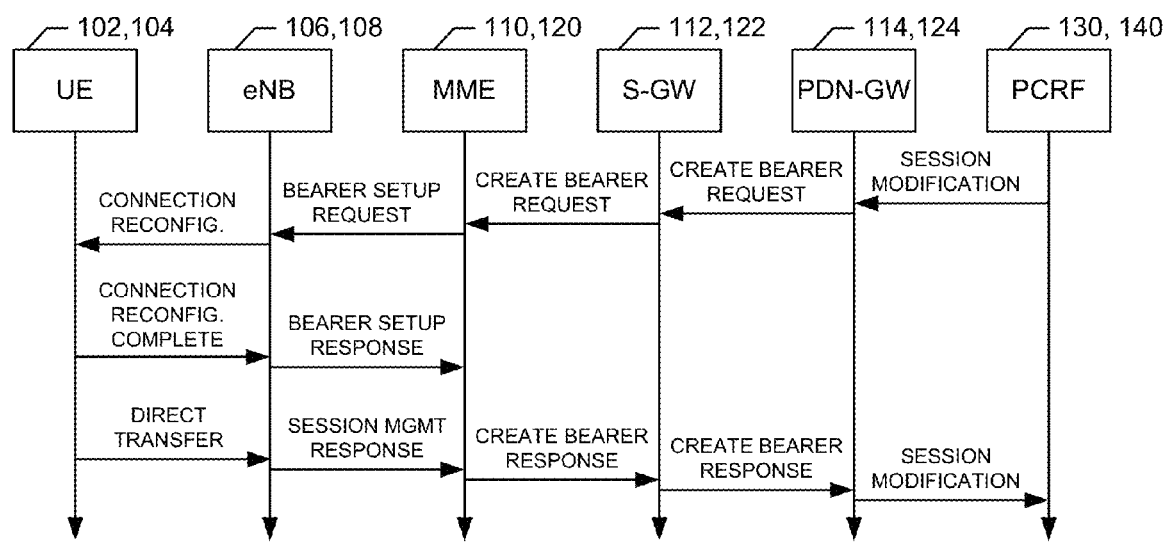
FIG. 4 is a sequence diagram of example messaging that may take place between devices to facilitate D2D communication

As shown in FIG. 4, the SIP messaging shown in FIG. 3 and described in detail below goes through the P-CSCF 132, which is a SIP proxy that is the entry point into the IMS core network for the IMS messages from the UE 102. The P-CSCF 132 inspects all of the SIP signaling and sends the SDP information that is contained inside the SIP messages to the PCRF 130. This information is used to set up the dedicated bearer(s) that are needed for the session. The Quality of Service (QoS) parameters for a particular bearer are derived from the SDP information since the SDP establishes the codecs used and associated bitrates. The PCRF 130 then sends messaging to the PDN Gateway 114, 124, the PDN Gateway 114, 124 sends messaging to the Serving Gateway 112, 122, the Serving Gateway 112, 124 sends messaging to MME 110, 120, the MME 110, 120 then sends a setup message to the eNB 106, 108, and finally a radio bearer with the appropriate QoS is established with the UE 102, 104. Then responses go from the UE 102, 104 all the way back to the PCRF 130. The goal of this messaging is that a radio bearer and EPC bearer with the appropriate QoS are established.

In one example, SIP preconditions may be used with the SIP messaging as shown in FIG. 3. The SDP in the SIP messaging includes an indication that a D2D link is to be established between the devices. Therefore, different SDP messaging is used to indicate this situation. In FIG. 3, an SDP Offer1 302 from the UE 102 to the UE 104 may take the form shown in FIG. 5. In the SDP Offer1 302 of FIG. 5, three audio codecs are offered 502. The last two lines 504, 506 of the SDP indicate preconditions. For example, as shown in FIG. 5, 504 indicates that no D2D link is currently established and 506 indicates a precondition that a D2D link is to be established. The precondition of 506 indicates that no media session can take place until a D2D link is established in both the send and receive direction at the UE 102. In the example of FIG. 5, UE 102 and UE 104 are likely on the same network because they are in D2D range. Accordingly, there may be no need for "remote" and "local" identifiers. In the case of D2D the messaging sequence in FIG. 4, which originates at the PCRF 130 and goes to the UE 104 and all the way back to the PCRF 130 would indicate that a D2D link is to be established. This may result in the fact that no dedicated EPC bearers are established because for D2D only a radio bearer that corresponds to the appropriate QoS is needed in addition to the default bearer.

An SDP Answer1 304 from the UE 104 to the UE 102 may be as shown in FIG. 6. The SDP Answer1 may be sent in a SIP 183 response (Session Progress). The SDP Answer1 304 includes a list of all offered codecs that are supported by the UE 104 (602). The SDP Answer1 304 also includes an indication that currently there is no D2D link established (604) and also includes a response that D2D is mandatory (606) because the UE 104 has agreed to the D2D connection.

An SDP Offer2 306 from the UE 102 to the UE 104 may be as shown in FIG. 7. The SDP Offer2 306 may be sent in the acknowledgment of the provisional 183 response or PRACK SIP request. In the SDP Offer2, the UE 102 indicates selection of AMR-WB as the codec to be used in the session 702. Additionally, the SDP Offer2 306 includes an indication that no D2D session is currently operating (704) and that a D2D session is mandatory (706). The codec for the session is known and, therefore, the resource reservation process can begin.

When the UE 104 receives the second SDP offer inside the SIP PRACK request, the UE 104 knows that AMR-WB is to be used for the session. SDP offers and answers are not necessarily coupled with SIP requests and responses. However, in the case of D2D both UEs 102 and 104 only need a single send and receive direction for each dedicated bearer instead of one send and receive for UE 102 and a separate send and receive radio bearer for UE 104. Therefore the PCRF 130 either does not initiate the same messaging for UE 104 as for UE 102 (which may be determined by the SIP messaging) or the PCRF 130 correlates the two message streams so that there are not independent sets of radio bearers established. Accordingly, in SIP responses and D2D preconditions in the SDP, messaging from the eNB 106 (and possibly 108) may just indicate which physical channel is to be used to send information between the UEs 102 and 104, and not reconfigure the RRC connection for data payload between UE and eNB.

The SDP Answer2 308 from the UE 104 to the UE 102 may be as shown in FIG. 8. The SDP Answer2 308 includes the agreed-upon codec 802. The SDP Answer2 308 also includes an indication that currently there is no D2D link established (804) and also includes a response that D2D is mandatory (806) because the UE 104 has agreed to the D2D connection.

At this point the D2D link can be tested. Resources for a D2D link have been assigned by the eNB 106, 108 and communicated to the UE 102 and the UE 104. The UE 102 might test the link with UE 104 and vice-versa. Once the link has been tested and found to be successful, the SIP UPDATE message with SDP Offer3 310 is sent from the UE 102. This informs the network of the status of communication. One example of an SDP Offer3 message 310 is shown in FIG. 9. One difference between the SDP Offer3 310 and the SDP Offer2 306 is that the UE 102 client indicates that now the current status is that resources have been successfully reserved in the send and receive direction (902).

When the UE 104 receives the SDP Offer3 310, the UE 104 replies with an SDP Answer3 312 in the SIP OK response to the SIP UPDATE request confirming that resources have been established. In one example, the SDP Answer3 312 may be as shown in FIG. 10. As shown in FIG. 10, SIP preconditions have now been satisfied. Resources have been successfully reserved in both directions between the UE 102 and the UE 104 and at this point the UE 104 will start ringing (314).

During the forgoing process, it is possible that the D2D link cannot successfully be established or can be established for one media type, but not another. A further indication in the SDP might indicate that if any of the media types cannot be established via a D2D link that none of the media types should be conducted over D2D, or whether it is OK to allow some via D2D. Also, because a D2D link might not be established then there may be an indication in the messaging of FIG. 3 to establish EPC bearers until the D2D link is established in case the D2D link fails. If the SDP precondition line indicates "optional" instead of mandatory, then possibly the dedicated EPC bearer can be set up as in FIG. 3. Of course if D2D is mandatory then there is no need to have an EPC bearer because this indicates that the client does not want to establish a non-D2D communication session, which may include text, voice, video, file transfer, etc.

If, when testing the D2D link, the UE 102 determines that communication quality would not be acceptable, the UE 102 could send a SIP Cancel for the outstanding SIP Invite. Likewise, the UE 104 could reject the invite with an error message that indicates that the D2D link quality is not acceptable. Both the UE 102 and the UE 104 can monitor the link quality during the call. If the quality is not at a sufficient level, either the UE 102 or the UE 104 might issue a SIP re-INVITE that proposes continuing the call using a non-D2D radio link, for example ordinary LTE. All SIP signaling traverses the IMS network and is not sent directly between devices so that resources and QoS can be allocated. Additionally, other actions may be taken to modify a device-to-device communication session based on link quality. For example, modifications may include changing the type of application (text/audio/video/file) that can communicate over the D2D link and/or changing the configuration of the D2D communication session and/or terminating the D2D session when link quality deteriorates.

In the solution described above, the UE 102 does not test the D2D link (by, for example transmitting a beacon or signature at the physical layer) until the UE 102 is ready to initiate a session. The advantage of this approach is that this is more battery friendly than if the UE 102 is constantly sending a beacon signal so that other contacts may discover if the UE 102 is in proximity in the event that they want to establish a D2D connection with the UE 102. There is also limited messaging and less use of network resources than if all users periodically transmit a beacon signal.

Figure 11:
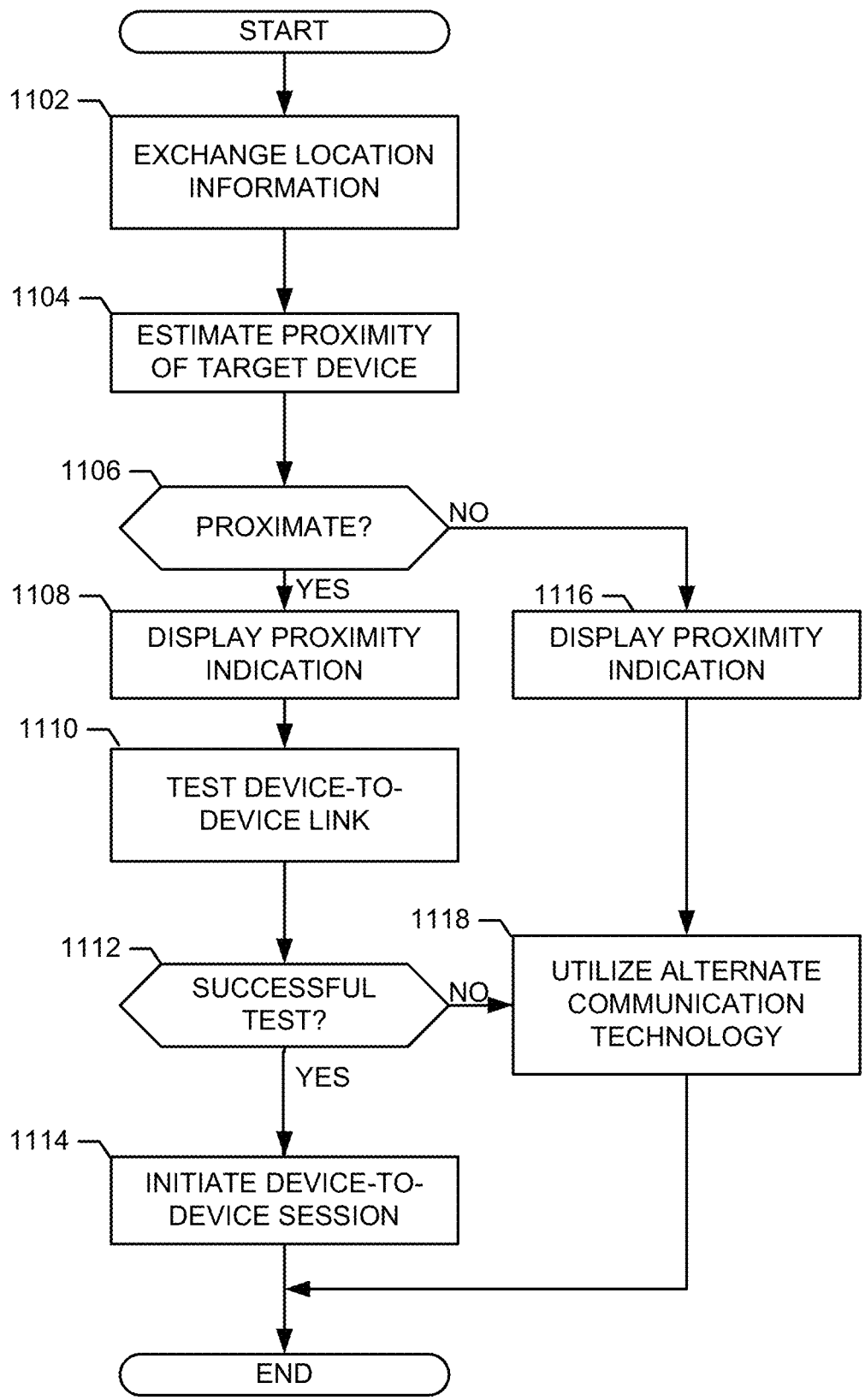
FIG. 11 is a flow diagram of a process that may be implemented using machine readable instructions to facilitate D2D communication.

FIG. 11 is a flow diagram of a process that may be carried out by a UE 102 to facilitate D2D communication. According to the process of FIG. 11, the EAB is updated with D2D proximity information prior to session initiation. The outcome of testing a D2D link with nearby contacts is indicated in the EAB (D2D proximity confirmed or not). One advantage of this approach is faster session initiation because the D2D link has been tested in advance (possibly multiple times as devices can be moving), although more messaging and resources are necessary, which may result in more network traffic and battery consumption at the UE 102.

As shown in FIG. 11, the UE 102 exchanges location information with capable devices (block 1102). As explained above, the location information may be GNSS information, such as GPS information, or any other suitable information. After location information is exchanged (block 1102), the UE 102 estimates D2D proximity of a target device (e.g., the UE 104) (block 1104) and determines if the UE 104 is proximate the UE 102 (block 1106). As explained above, the identity information of the target device may be obtained from an address book stored in and maintained by the UE 102. As explained above, D2D proximity may be estimated using a number of different techniques. If the UE 102 determines that the UE 104 is proximate (block 1106), the UE 102 generates a proximity information element and displays a proximity indication (block 1108). The UE 102 may provide the proximity indication via a user interface, for example, an indication in the EAB, or in any other suitable manner.

The UE 102 then tests the D2D link with one or more devices (e.g., the UE 104) (block 1110). In some examples, the UE 102 may test the D2D link by trying to establish a D2D session with the UE 104 without the users of the UEs 102, 104 being aware of such an operation. For example, the UE 102 may initiate a D2D session with the UE 104 and, once that D2D session is established, the UE 102 may suspend to tear down the link, but, at that point the DE 102 knows that the link to the UE 104 was successfully tested.

If the test of the D2D link was successful (block 1112), UE 102, can initiate a D2D session with the UE 104 (block 1114). This session may be initiated some time after the testing (block 1110). Regardless of the timing, it is the case that the D2D link is tested prior to the D2D session being initiated for use by the UE 102.

Alternatively, if the test (block 1110) was not successful (block 1112), an indication is made in, for example, the EAB or any other suitable location that an alternate communication channel should be used to communicate with the UE 104 (block 1118).

Figure 12:
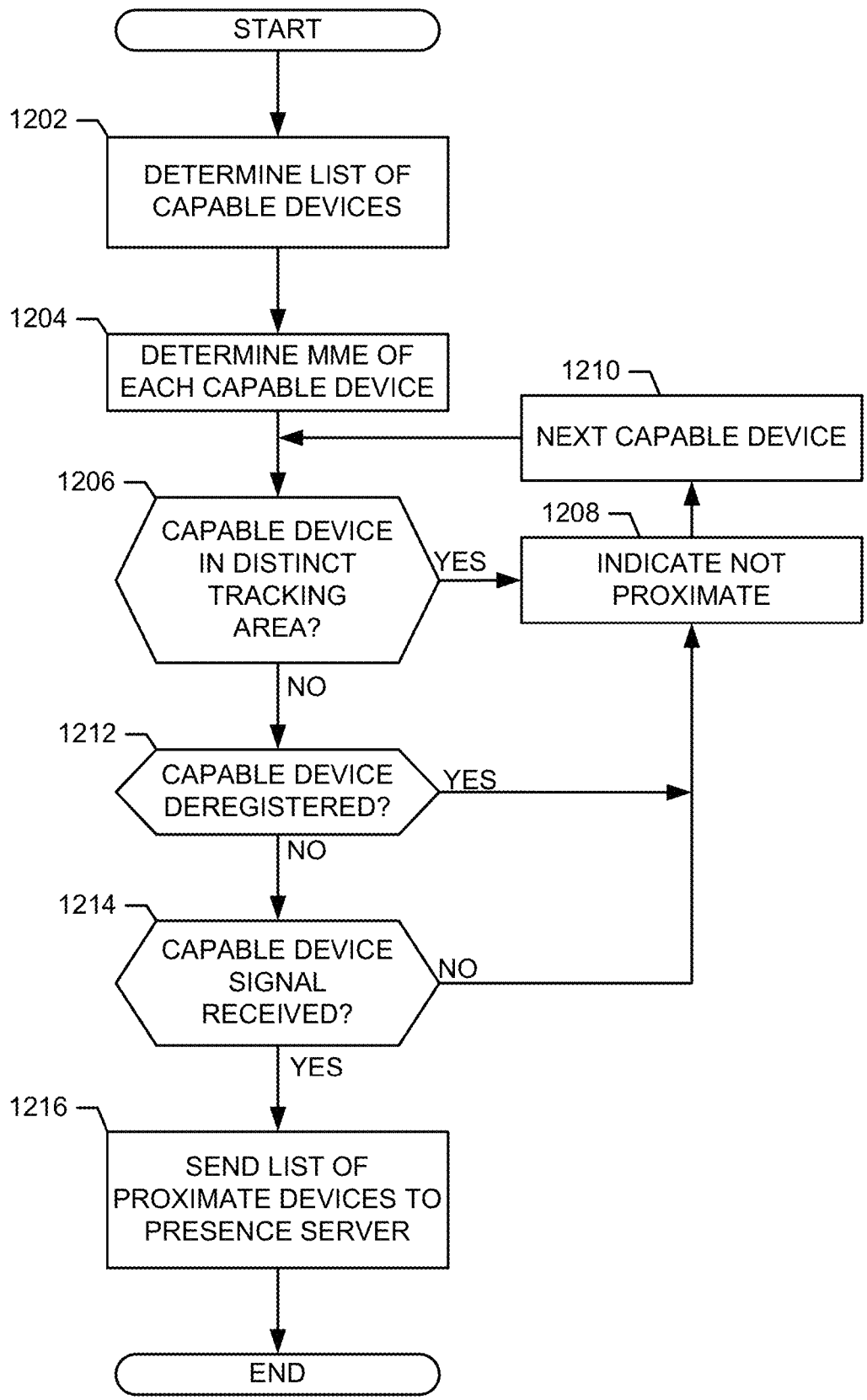
FIG. 12 is a flow diagram of a process that may be implemented using machine readable instructions to facilitate D2D communication.

If an estimation indicates that there is a high probability of successfully establishing a D2D link between the UE 102 and the UE 104 (for example if the estimate of D2D proximity is a flag and has value "1") additional testing can be carried out to confirm D2D proximity, as shown in FIG. 12. The process of FIG. 12 can be carried out either automatically or upon request of the user. The D2D proximity status, once confirmed and generated, can be displayed in the EAB.

As shown in FIG. 12, the UE 102 determines a list of D2D capable devices that are proximate. For example, assuming the UE 104 has opted to be discoverable, the UE 104 device periodically broadcasts its signature radio signal. How the signature is sent is configurable. In one example, the transmission power may be configured by the base station such that interference to other users is limited. The transmission power can also vary in a predefined pattern, e.g., starting with a low power and gradually increase the power till a predefined maximum is reached. In another example, the transmission is configured to be more frequent if the D2D service is manually triggered by the user, and configured to be less frequent if the D2D service is running automatically. The transmission frequency can also be configured by the eNB 106 and 108, e.g., less frequent if the cell load is high, and more frequent if the cell load is low.

Using 3GPP LTE as an example, the process of establishing a D2D link with network assistance is described below. When the UE 104 is in RRC-CONNECTED state (whether DRX or not), the eNB 108 configures how the UE 104 transmits the signature signal including the time-frequency resources and signal format. When the UE 104 is in RRC-IDLE state, NAS signaling configures how the UE 104 transmits the signature signal.

After the list of D2D capable devices is determined (block 1202), the UE 102 determines the MME of each capable device (block 1204). For example, the UE 102 may contact the MME 110 with a list of contact IDs, such as the list of addresses that are stored in the UE (e.g., SIP-URI). Accordingly, the UE 102 may submit the identity information for one or more target devices to a communication network of which the MME is a part. The MME 110 determines the MME to which each contact is currently connected (block 1204). For example, the MME 110 may contact a home subscriber service (HSS) to determine that that UE 104 is connected to the MME 120. A HSS is a master user database in the 3GPP network that contains subscription-related information.

Each contact in the contact list (e.g., each contact in the list of capable devices), is tested to see if it is in a distinct tracking area from the UE 102 (block 1206). If the UE 104, for example, is in a distinct tracking area (block 1206), the UE 104 will be indicated as not proximate (block 1208) and the next capable device is selected for evaluation (block 1210). For example, the test may be to determine if the UE 104 is in a non-adjacent, non-overlapping tracking area from that of the UE 102. As an additional example, that test may include determining if the UE 102 and the UE 104 are served by two different MMEs. If this is the case, the MME 110 may contact the MME 120 to obtain information regarding the UE 104 connection status, tracking area, and which eNB the UE 104 is connected to (if the UE 104 is in RRC-CONNECTED state). If the UE 102 and the UE 104 are served by the same MME, then information for the UE 104 does not need to be fetched from another MME.

The process of FIG. 12 then determines if each capable device (e.g., the UE 104) is in an EMM-DEREGISTERED state (block 1212). If the UE 104 is in the EMM-DEREGISTERED state, the UE 104 is considered not in proximity of the UE 102 (block 1208).

If the capable device is not in a distinct tracking area (block 1206) and the capable device is not deregistered (block 1212), the UE 102 determines if a signal can be received from the UE 104 (block 1214). For example, if the UE 104 is in an EMM-REGISTERED state, then if the UE 104 is in RRC-IDLE mode, the MME 120 is aware of the signature of the UE 104 signal transmission, and provides such info to the MME 110, which passes this information to the UE 102 via NAS signaling. The UE 102 scans to see if the radio signal from the UE 104 can be received. If the UE 104 is in RRC-CONNECTED state, the MME 110 contacts eNB 108. If the UE 102 and the UE 104 are attached to the same eNB, that eNB provides the UE 102 with the signature signal information for UE 104. The UE 102 scans accordingly to see if the radio signal for UE 104 can be received. If UE 102 and the UE 104 are served by two different eNBs (e.g., 106 and 108), and an X2 interface exists between the eNBs, the MME 110 notifies eNB 108 to give eNB 106 the signature signal configuration of the UE 108. After obtaining such information from eNB 108, eNB 106 passes the information to the UE 102. The UE 102 scans accordingly to see if the radio signal of UE 104 can be received by the UE 102. If the UE 102 cannot receive signals from the UE 104 (block 1214), the DE 104 is indicated as not proximate (block 1208).

After all the capable devices have been evaluated for proximity as described above, a final list of proximate devices is sent to a presence server (block 1216). Additionally, the DE 102 device generates a proximity information element and displays an "in proximity" marking on the user interface of the UE 102 for each contact in the final list. Contacts not in the final list are either marked as "not in proximity" or left unmarked. If the UE 102 becomes dormant (DRX), then the UE 102 wakes up during DRX on-duration to scan if any discoverable contacts are in proximity.

The proximity display does not apply to anonymous fetch from presence server to protect privacy. In other words, only authorized users that have been granted the privilege to receive the "in-proximity" information will be notified of such information. An unauthorized user is not able to detect that the UE 102 is in-proximity, or that the UE 102 and the UE 104 are in proximity of each other.

Figure 13:
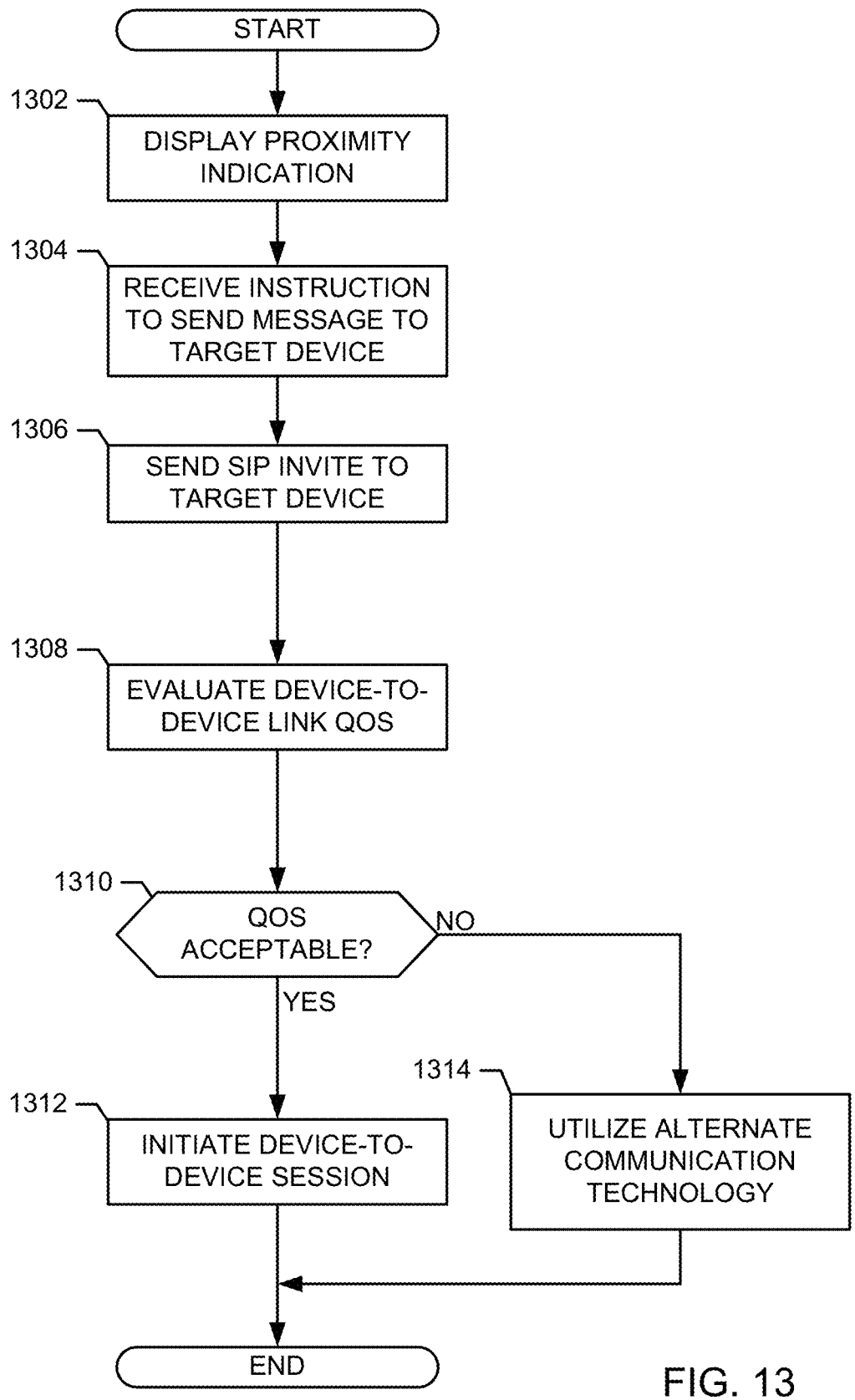
FIG. 13 is a flow diagram of a process that may be implemented using machine readable instructions to facilitate D2D communication.

As shown in FIG. 13, when the UE 102 discovers a contact (e.g., UE 104) is in proximity (e.g., through display of a proximity indication (block 1302)), the UE 102 may receive instruction to send a message to a target device (e.g., a particular device in proximity) (block 1304). The instructions may be provided to the mobile equipment through a user interface on the UE 102.

The UE 102 sends a SIP invite via IMS core to the target device (e.g., the UE 104) to set up a D2D connection, and negotiate the parameters for the D2D link (block 1306).

The UE 102 evaluates the of D2D link (block 1308). If the quality of the D2D link is satisfactory for the service requested (block 1310), a D2D session is initiated as a result of the negotiation (block 1312). The D2D link can be used, for example, for MSRP/RTP transport of messaging/video/audio or file transfer between the UE 102 and the UE 104, without going through the base station 106, 108 or gateway 112, 122. If the quality of the D2D link is not satisfactory for the service requested (block 1310), an alternate communication technology can be selected for communication between the UE 102 and the UE 104. For example, the service packets traverse the base stations 106, 108 and gateways 112, 122, as described above.

If the link attributes change and it is determined that communication quality would not be acceptable, actions may be taken to modify a device-to-device communication session based on link quality. For example, modifications may include changing the type of application (text/audio/video/file) that can be run over the D2D link and/or changing the configuration of the D2D communication session and/or terminating the D2D session when link quality deteriorates.

The architecture is changed compared to existing architecture. SIP signaling is exchanged via the network to set up the call. The SIP servers make sure that the connection is allowed, QoS is satisfied, and is properly charged. But actual service packets (e.g., message/video/file transfer) are delivered directly between devices.

Once a D2D link is established, the service packets are sent from the UE 102 to the UE 104. When the UE 102 detects that the D2D link is broken, then the data connection is routed via eNB 106, so that the service is continued seamlessly to the consumer. Such radio link failure may happen due to mobility of user or link quality deterioration over the D2D link.

As explained herein, utilizing D2D communication, data is exchanged directly between two UEs or among more than two UEs. One advantage of D2D communication is that the messages transmitted over the D2D link are not stored by the network or distributed to multiple clients. This reduces the network burden while still facilitating communication between UEs. However, if resources are assigned by the network (for example an eNB), then it is possible for the network to listen to D2D communication as a receiver, which enables the network to store and forward the messages exchanged over the D2D link to maintain the same multi-device experience currently provided by RCS.

According to the RCS specification, to handle multiple device environments, an incoming message is delivered to all clients of a user that are online and capable of handling the RCS message. If all clients of a user were offline when a message has to be delivered, the message will be delivered to the first client that comes online if the message has not expired in the meantime. A client supporting the RCS messaging service will be capable of showing the messages that were sent and received while it was offline. The messages shall remain available to those clients until they are deleted from one of the online clients.

If the same multi-device experience needs to be maintained, then the eNB needs to listen in on the D2D communication as a receiver. The eNB could then receive and store the messages exchanged over the D2D link for both users involved. The eNB also passes the service packets to the servers so that messages can be delivered to multiple devices of the same user. The eNB might listen to the D2D communication using smart antenna technology knowing the location of the D2D users. Such a service would consume more network resources and, therefore, might be charged at a higher rate.

Figure 14:
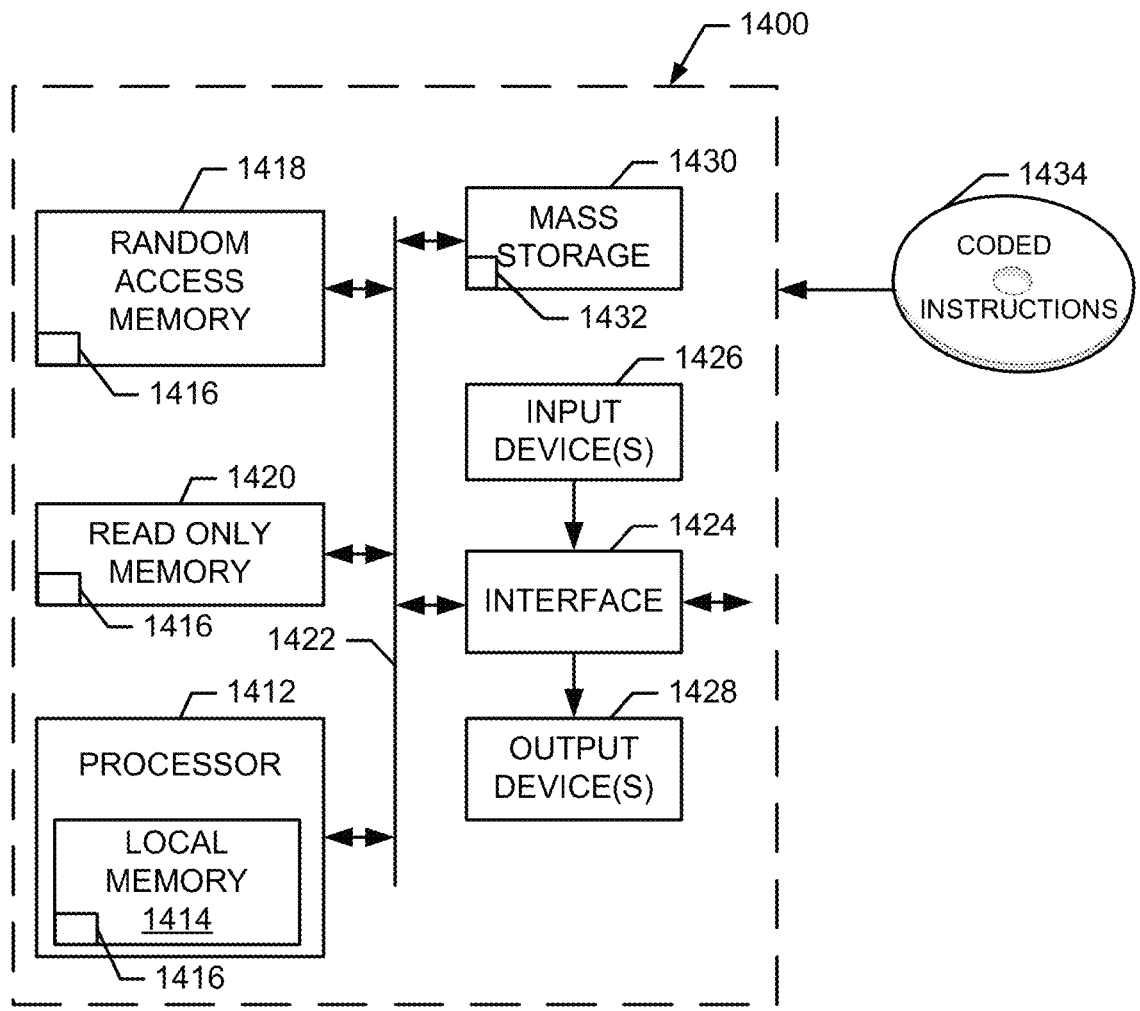
FIG. 14 is a diagram of example hardware that may carry out some of the processes described herein.

FIG. 14 is a block diagram of an example processing system 1400 capable of implementing the apparatus and methods disclosed herein. The processing system 1400 can correspond to, for example, a mobile station processing platform, a network element processing platform, a server, a personal computer, a personal digital assistant (PDA), an Internet appliance, a mobile phone, or any other type of computing device. For example the processing system 1400 may implement the UE 102 and any component of the mobile communication networks shown in the drawings.

The system 1400 of the instant example includes a processor 1412 such as a general purpose programmable processor, an embedded processor, a microcontroller, etc. The processor 1412 includes a local memory 1414, and executes coded instructions 1416 present in the local memory 1414 and/or in another memory device. The processor 1412 may execute, among other things, machine readable instructions to implement the processes represented in the drawings described above. The processor 1412 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown).

The system 1400 also includes an interface circuit 1424. The interface circuit 1424 may be implemented by any type of interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the system 1400 also includes one or more non-transitory, computer-readable mass storage devices 1430 for storing software and data. Examples of such mass storage devices 1430 include floppy disk drives, hard drive disks, compact disk drives and digital versatile disk (DVD) drives.

As an alternative to implementing the methods and/or apparatus described herein in a system such as the device of FIG. 14, the methods and or apparatus described herein may be embedded in a structure such as a processor and/or an ASIC (application specific integrated circuit).

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method to facilitate device-to-device communication between a first device and a second device, the method comprising:
   obtaining an identity information of the second device from an address book;
   submitting the identity information of the second device to a communication network;
   estimating device-to-device (D2D) proximity of the second device;
   generating an indication of the D2D proximity of the second device relative to the first device;
   initiating a device-to-device communication session with the second device when the indication is that the second device is proximate; and
   sending Session Description Protocol (SDP) information to the second device containing SDP extensions for a Session Initiation (SIP) preconditions framework, wherein the SDP extensions indicate a precondition that a D2D link be established between the first and the second device.

2. The method of claim 1, wherein estimating D2D proximity of the second device is based on received location information of the second device.

3. The method of claim 2, wherein the location information of the second device is received from the second device in response to a Geolocation Pull request.

4. The method of claim 2, wherein the location information of the second device is received in a Geolocation Push message.

5. The method of claim 2, wherein the location information of the second device is received from a presence server.

6. The method of claim 1, wherein estimating D2D proximity of the second device comprises determining a tracking area of the second device.

7. The method of claim 1, wherein estimating D2D proximity of the second device comprises determining a registration status of the second device.

8. The method of claim 1, further comprises displaying the indication of the proximity.

9. The method of claim 8, wherein displaying the indication comprises displaying the indication in an address book.

10. The method of claim 1, wherein the proximity of the second device is included in presence information of the first device and sent to a presence server.

11. The method of claim 1, further comprising testing a device-to-device connection prior to initiating the device-to-device communication session.

12. The method as defined in claim 11, further comprising generating a proximity information element based on testing the device-to-device connection, and including the proximity information element in a presence information of the first device.

13. The method of claim 1, further comprising utilizing an alternate communication technology to communicate with the second device when the second device is not proximate.

14. The method of claim 1, further comprising
   evaluating a link quality of the device-to-device communication session;
   modifying the device-to-device communication session based on the link quality.

15. A mobile device configured to facilitate device-to-device communication between a first device and a second device, the mobile device comprising a processor configured to:
   obtain an identity information of the second device from an address book;
   submit the identity information of the second device to a communication network;
   estimate device-to-device (D2D) proximity of the second device;
   generate an indication of the proximity of the second device relative to the first device;
   initiate a device-to-device communication session with the second device when the indication is that the second device is proximate; and
   send Session Description Protocol (SDP) information to the second device containing SDP extensions for a Session Initiation (SIP) preconditions framework, wherein the SDP extensions indicate a precondition that a D2D link be established between the first and the second device.

16. The mobile device of claim 15, wherein the processor is configured to send a Session Initiation (SIP) INVITE message to the second device.

17. The mobile device of claim 15, wherein the processor is configured to estimate D2D proximity of the second device based on received location information of the second device.

18. The mobile device of claim 17, wherein the location information of the second device is received from a presence server.

19. The mobile device of claim 15, wherein the processor is configured to display the indication of the proximity in an address book.

20. The mobile device of claim 15, wherein the proximity of the second device is included in presence information of the first device and sent to a presence server.

21. A tangible, non-transitory, computer readable storage medium comprising instructions that, when executed, cause a machine to:
   obtain an identity information of the second device from an address book;
   submit the identity information of the second device to a communication network;
   estimate device-to-device (D2D) proximity of the second device;
   generate an indication of the proximity of the second device relative to the first device;
   initiate a device-to-device communication session with the second device when the indication is that the second device is proximate; and send Session Description Protocol (SDP) information to the second device containing SDP extensions for a Session Initiation (SIP) preconditions framework, wherein the SDP extensions indicate a precondition that a D2D link be established between the first and the second device.

22. The tangible, non-transitory, computer readable storage medium of claim 21, further comprising instructions that, when executed, cause a machine to send a Session Initiation (SIP) INVITE message to the second device.

23. The tangible, non-transitory, computer readable storage medium of claim 21, further comprising instructions that, when executed, cause a machine to estimate D2D proximity of the second device based on received location information of the second device.

24. The tangible, non-transitory, computer readable storage medium of claim 23, wherein the location information of the second device is received from a presence server.

25. The tangible, non-transitory, computer readable storage medium of claim 21, further comprising instructions that, when executed, cause a machine to display the indication of the proximity in an address book.

26. The tangible, non-transitory, computer readable storage medium of claim 21, wherein the proximity of the second device is included in presence information of the first device and sent to a presence server.

\* \* \* \* \*